United States Patent
Schindewolf et al.

(10) Patent No.: US 9,302,308 B2
(45) Date of Patent: Apr. 5, 2016

(54) TOOL CARTRIDGES FOR SHEET METAL PROCESSING TOOLS

(75) Inventors: Leonard Schindewolf, Leonberg (DE); Patrick Haug, Schopfloch (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 847 days.

(21) Appl. No.: 13/476,261

(22) Filed: May 21, 2012

(65) Prior Publication Data

US 2012/0309600 A1    Dec. 6, 2012

(30) Foreign Application Priority Data

May 31, 2011 (EP) .................................... 11168185

(51) Int. Cl.

| | |
|---|---|
| *B21D 28/02* | (2006.01) |
| *B21D 45/00* | (2006.01) |
| *B21D 45/06* | (2006.01) |
| *B21D 37/04* | (2006.01) |
| *B21D 37/14* | (2006.01) |
| *B21D 28/26* | (2006.01) |
| *B23Q 3/155* | (2006.01) |

(52) U.S. Cl.
CPC ................ *B21D 28/02* (2013.01); *B21D 28/26* (2013.01); *B21D 37/04* (2013.01); *B21D 37/14* (2013.01); *B21D 45/006* (2013.01); *B21D 45/06* (2013.01); *B23Q 3/15553* (2013.01); *Y10T 483/1809* (2015.01)

(58) Field of Classification Search
CPC ........ B21D 37/14; B21D 37/04; B21D 28/34; B21D 28/02; B21D 28/26; B21D 45/003; B21D 45/006; B21D 45/06; B21D 45/00; B23Q 3/15553; B23Q 3/15546
USPC .................................. 72/444, 446; 483/28, 29
See application file for complete search history.

(56) References Cited

U.S. PATENT DOCUMENTS

| | | | |
|---|---|---|---|
| 3,678,562 A * | 7/1972 | Leibinger .......................... 483/1 |
| 4,485,549 A | 12/1984 | Brolund | |
| 4,951,375 A * | 8/1990 | Erlenmaier ...................... 72/444 |
| 6,443,864 B1 * | 9/2002 | Friedmann ...................... 474/18 |
| 7,669,453 B2 * | 3/2010 | Palick et al. .................... 72/444 |
| 7,913,533 B2 * | 3/2011 | Lee et al. ......................... 72/444 |
| 2007/0186744 A1 * | 8/2007 | Lee et al. ......................... 83/563 |
| 2007/0191199 A1 | 8/2007 | Palick et al. | |
| 2010/0095824 A1 * | 4/2010 | Laib .................................. 83/549 |
| 2012/0312067 A1 * | 12/2012 | Broadbent et al. .............. 72/462 |

FOREIGN PATENT DOCUMENTS

| | | |
|---|---|---|
| CN | 101415522 A | 4/2009 |
| WO | WO2007097824 A3 | 11/2007 |

* cited by examiner

*Primary Examiner* — Edward Tolan
*Assistant Examiner* — Mohammad I Yusuf
(74) *Attorney, Agent, or Firm* — Fish & Richardson P.C.

(57) ABSTRACT

In some aspects, a tool cartridge for detachably holding tool parts includes a cartridge base body, a punch holder configured to detachably hold a processing punch, and a die holder configured to detachably hold a processing die. The punch holder and the die holder project from a front side of the cartridge base body and are arranged one above another to form an intervening space. The cartridge base body is defined along a rear side that is opposite from free ends of the punch holder and the die holder by a base body rear wall. The base body rear wall defines, within the intervening space, a wall opening that is open for receiving a third tool part holder. A base-body-side fastening device is provided on the cartridge base body, by which the third tool part holder received in the wall opening is connected to the cartridge base body.

9 Claims, 3 Drawing Sheets

TOOL CARTRIDGES FOR SHEET METAL PROCESSING TOOLS

CROSS-REFERENCE TO RELATED APPLICATION

This application claims priority under 35 U.S.C. §119 to European Patent Application No. EP 11 168 185.4, filed on May 31, 2011. The contents of this priority application are hereby incorporated by reference in their entirety.

TECHNICAL FIELD

The present invention relates to tool cartridges for sheet metal processing tools.

BACKGROUND

Tool cartridges can be used on machine tools for processing sheet metal workpieces and are typically used as a component of a tool magazine. In the tool magazine, processing tools are stored for use on a processing device of the machine tool. At the beginning of a sheet metal processing operation, tool parts for a required processing tool are taken from a tool cartridge and loaded into tool holding fixtures at the processing device of the machine tool, for example, as part of an automated procedure. When the processing job has been completed, the tool parts are taken from the tool holding fixtures of the processing machine and transferred back to the tool cartridge, for example, also as part of an automated procedure.

Depending on the processing job, the tool cartridges are equipped with various kinds of processing tools, for example, a multi-part punching tool or a multi-part forming tool. The punch holder of the tool cartridge is typically used for holding a punching punch or a forming punch, and the die holder of the tool cartridge is typically used for detachably holding a punching die or a forming die. A stripper holder, by which a third tool part of a punching tool (e.g., a stripper) can be detachably fastened to the tool cartridge, is provided between the punch holder and the die holder. Sheet metal forming tools (i.e., not punching tools) typically do not have a comparable third tool part. However, in some cases, the overall height of forming dies exceeds the overall height of the punching dies to be received by the tool cartridge. The greater overall height of the forming dies may be attributed, in particular, to the fact that the forming dies are provided with a so-called "ejector" for the formed workpiece.

An example tool cartridge is described in International Patent Publication No. WO 2007/097824 A2. The tool cartridge has a cartridge base body on which two punch-holding arms, a stripper holder, and two die-holding arms are mounted one vertically above another. The stripper holder includes an arcuate support for a stripper and a similarly arcuate base plate on which the support for the stripper is seated. The support for the stripper is fastened to the base plate supporting it from below and is also supported on the cartridge base body by arms that project towards the rear of the cartridge base body. The arcuate base plate of the stripper holder is integrally formed on the cartridge base body and projects in the horizontal direction at the front side of the cartridge base body to an extent such that its arc limbs overlap with the punch-holding arms and also with the die-holding arms. If the tool cartridge is to receive a forming tool in place of a punching tool, the arc limbs of the base plate of the stripper holder form an interfering contour especially for the processing die which is to be fastened to the die-holding arms.

SUMMARY

In some aspects, a tool cartridge for detachably holding tool parts of a multi-part processing tool for processing sheet metal workpieces includes a cartridge base body, a punch holder configured to detachably hold a processing punch, and a die holder configured to detachably hold a processing die. The punch holder and the die holder project from a front side of the cartridge base body and are arranged one above another to form an intervening space. The cartridge base body is defined along a rear side that is opposite from free ends of the punch holder and the die holder by a base body rear wall. The base body rear wall of the cartridge base body defines, within the intervening space between the punch holder and the die holder, a wall opening that is open towards the front side of the cartridge base body for receiving a third tool part holder, and a base-body-side fastening device is provided on the cartridge base body, by which the third tool part holder received in the wall opening is detachably connectable to the cartridge base body.

In the intervening space between the punch holder and the die holder, the base body rear wall of the cartridge base body has a wall opening in which a third tool part holder can be fastened, for example, for detachably securing the stripper of a punching tool. Due to the use of the base body rear wall, the site of attachment of the third tool part holder is at a distance (e.g., a maximum distance) from the punch holder and the die holder. If the third tool part holder is not mounted on the cartridge base body, then the likelihood of interfering contours, attributable to the third tool part holder, in the region of the punch holder and the die holder, and hence also in the region of the tool parts detachably fixed to the punch holder and the die holder, can be reduced (e.g., prevented). The reduction in interfering contours can be useful, for example, when the tool cartridge receives a forming tool. In that case, a third tool part holder is typically not required. Due to the absence of the third tool part holder, it is also possible to fasten the tool parts of the forming tool for which a third tool part holder would form an interfering contour to the punch holder and to the die holder of the tool cartridge.

Various possibilities are suitable for the configuration of the wall opening provided in the base body rear wall serving to receive a third tool part holder.

In some embodiments, the wall opening of the base body rear wall of the cartridge base body is constructed as a receiving pocket. Accordingly, the base body rear wall is not completely penetrated by the wall opening. A reduced-thickness portion of the base body rear wall forms a rearward boundary of the receiving pocket and can be used as a depth stop for the tool part holder that is to be inserted into the wall opening from the opposite side.

In some embodiments, the wall opening is constructed as a window-like opening of the base body rear wall. In some cases, the entire thickness of the base body rear wall can be used to support the third tool part holder.

In some embodiments, the third tool part holder can be received in the wall opening of the base body rear wall of the cartridge base body and secured directly to the wall opening.

In some embodiments, the third tool part holder can be secured to the cartridge base body using fasteners (e.g., threaded fasteners) and/or snap-in connections.

In some embodiments, a base-body-side fastening device for detachable connecting the third tool part holder to the cartridge base body is provided, which is accessible from the rear side of the cartridge base body. The base-body-side fastening device can provide simple mounting and demounting of the third tool part holder.

In some embodiments, the tool cartridge is configured to receive a punching tool and accordingly includes as a third tool part holder a stripper holder for detachably fixing a stripper.

For detachably fixing a stripper received by a tool cartridge, a separate holding device is typically provided. In some embodiments, the holding device is a component part of the third tool part holder. Accordingly, with the demounting of the third tool part holder or the stripper holder, the holding device serving to detachably fix a stripper is also demounted. Consequently, with the stripper holder demounted, the holding device also does not form any interfering contour at the tool cartridge.

The tool cartridges described herein can be flexibly adapted to receive processing tools of different geometries (e.g., different shapes and sizes).

The details of one or more embodiments of the invention are set forth in the accompanying drawings and the description below. Other aspects, features, and advantages will be apparent from the description and drawings, and from the claims.

DETAILED DESCRIPTION

Figure 1:
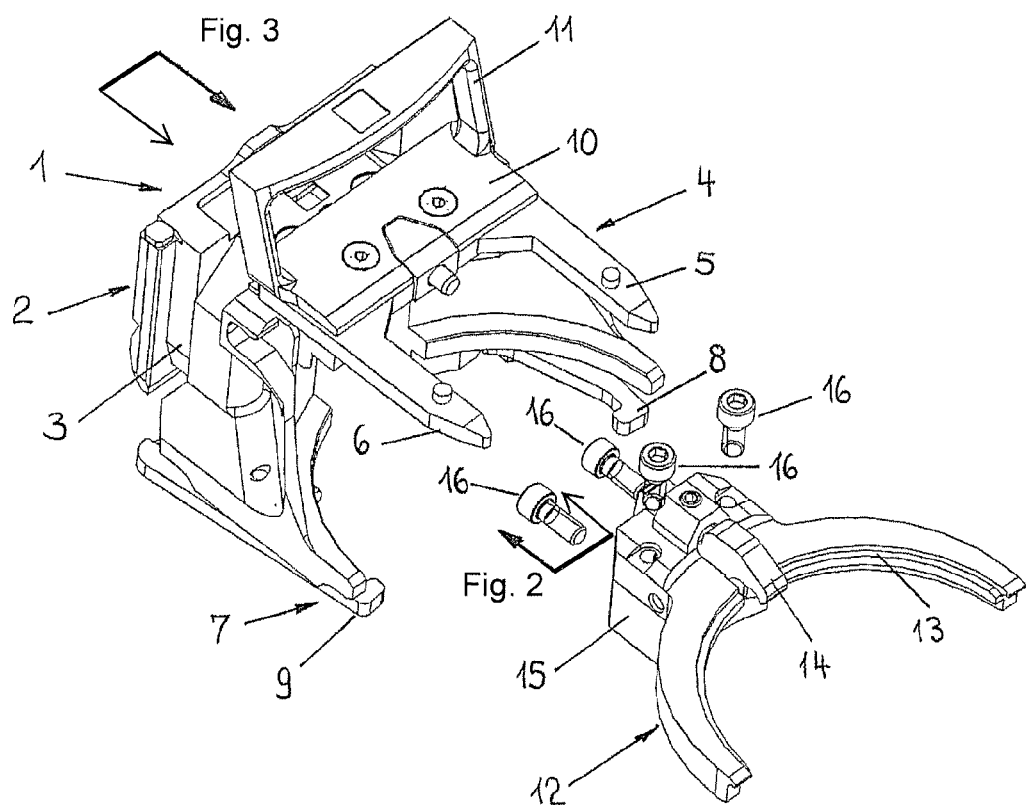
FIG. 1 is a perspective view of a tool cartridge and a demounted stripper holder.

As shown in FIG. 1, a tool cartridge 1 includes a cartridge base body 2 having a base body rear wall 3. The cartridge base body 2 is typically in the form of a metal casting. Supported on the cartridge base body 2 are a punch holder 4 with two punch-holding arms 5, 6 and a die holder 7 with two die-holding arms 8, 9. The punch-holding arms 5, 6 and the die-holding arms 8, 9 project from a front side of the cartridge base body 2 and are supported thereon so as to pivot about vertical axes. Starting from their position shown in FIG. 1, the punch-holding arms 5, 6 and the die-holding arms 8, 9 may be spread apart against the opposing force of restoring springs. The punch-holding arms 5, 6 and the die-holding arms 8, 9 are vertically spaced from one another to form an intervening space.

At an upper region of the tool cartridge 1, a cover plate 10, which is fastened to the cartridge base body 2, extends over the ends of the punch-holding arms 5, 6 that are near the cartridge base body 2. In addition, a holding bracket 11 of the tool cartridge 1 is fastened to the cartridge base body 2 via the cover plate 10.

In the configuration shown in FIG. 1, the tool cartridge 1 serves to receive a forming tool having tool parts that include a forming punch and a forming die. The forming punch and the forming die can include various conventional types and, for simplicity, are not shown. The forming punch can be held on the tool cartridge 1 by the punch-holding arms 5, 6 of the punch holder 4. Correspondingly, the forming die can be held to the tool cartridge 1 using the die-holding arms 8, 9 of the die holder 7. The punch holder 4 and the die holder 7 are spaced apart so that sufficient space is available at the tool cartridge 1 for the forming punch and the forming die. In particular, a forming die having a relatively great overall height can be accommodated in the intervening space between the punch-holding arms 5, 6 and the die-holding arms 8, 9.

The free space for the tool parts of the forming tool is available between the punch holder 4 and the die holder 7 because, in the configuration shown in FIG. 1, the tool cartridge 1 is not fitted with a third tool part holder, which is shown in the demounted state in FIG. 1. The third tool part holder is a stripper holder 12 which is typically required when the tool cartridge 1 receives certain types of punching tools. For example, the stripper holder 12 can be used to receive a punching tool having a punching punch, a punching die, and a stripper which, when sheet metal is being punched, serves to strip the punched metal sheet off of the punch on the return stroke of the punch. For the sake of simplicity, a punching tool is not shown in the drawings.

As shown in FIG. 1, the stripper holder 12 has an arcuate stripper support 13, a holding device 14 provided thereon, and a rearward mounting attachment 15. The stripper support 13 supports the edge of a stripper received by the tool cartridge 1. The holding device 14 extends over an upper surface of the support stripper 13. At the mounting attachment 15, the stripper holder 12 and the cartridge base body 2 can be fastened to one another, for example, using fastening screws 16.

Figure 2:
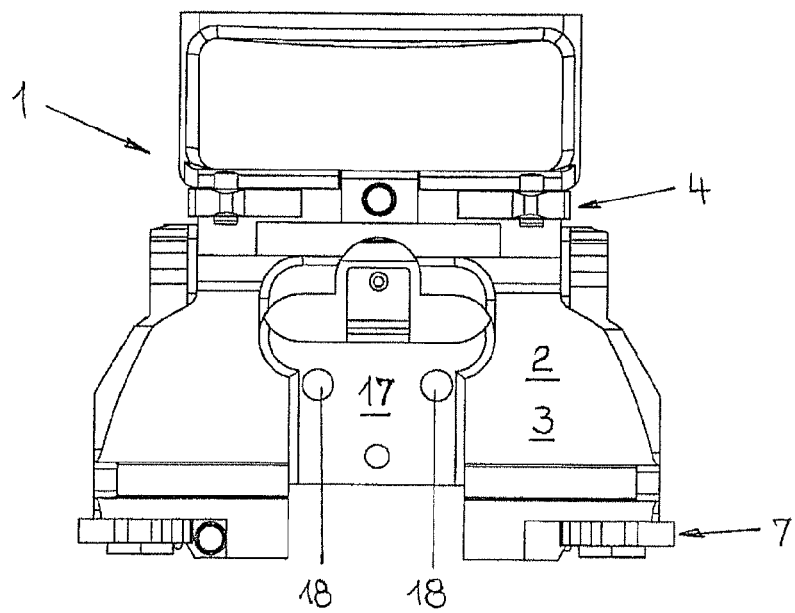
FIG. 2 is a front view of the tool cartridge shown in FIG. 1.
Figure 3:
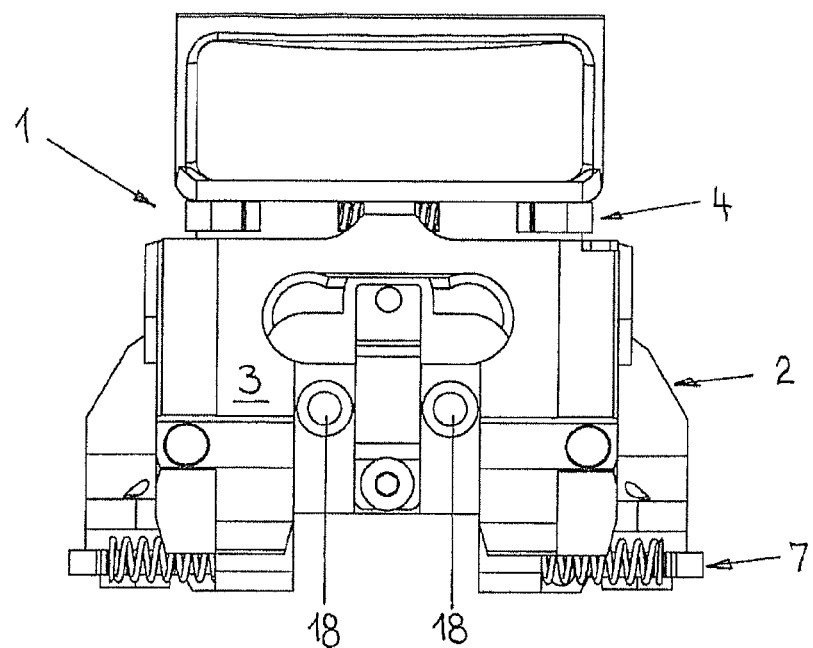
FIG. 3 is a rear view of the tool cartridge shown in FIG. 1.

As shown in FIG. 2, the base body rear wall 3 of the cartridge base body 2 includes a wall opening 17. The wall opening 17 is constructed as a receiving pocket and is sized and configured to receive the mounting attachment 15 on the stripper holder 12. The rearward boundary of the wall opening 17 is formed by a reduced-thickness region of the base body rear wall 3. In the reduced-thickness region, the base body rear wall 3 is provided with base-body-side fastening devices in the form of fastening bores 18. The fastening bores 18 are also illustrated in FIG. 3.

If the tool cartridge 1 is to be changed from the configuration shown in FIG. 1 in order to receive a punching tool, then the stripper holder 12 is to be inserted into the wall opening 17 at the base body rear wall 3 of the cartridge base body 2 by the mounting attachment 15 from the front side of the tool cartridge 1. Due to the contour of the wall opening 17 and the contour of the mounting attachment 15 on the stripper holder 12 being substantially matched to one another, the mounting attachment 15 is received in the wall opening 17 substantially without substantial variability. The rearward boundary of the wall opening 17 forms a depth stop for the mounting attachment 15 pushed into the wall opening 17.

Once the stripper holder 12 has been received in the wall opening 17 via the mounting attachment 15, two fastening screws 16 are screwed from the rear side of the cartridge base body 2, through the fastening bores 18 and into associated bores provided with an internal screw-thread in the mounting attachment 15. Another screwed connection between the stripper holder 12 and the cartridge base body 2 is made from the upper side of the tool cartridge 1 using two additional fastening screws 16.

Figure 4:
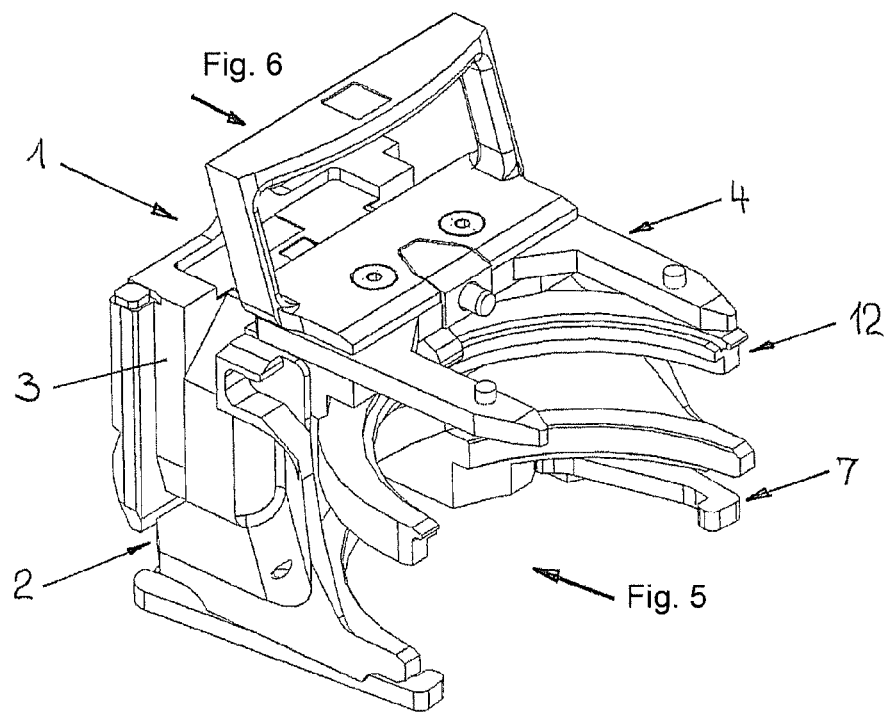
FIG. 4 is a perspective view of the tool cartridge shown in FIG. 1 with a stripper holder mounted thereto.

When the stripper holder 12 is secured to the cartridge base body 2, the configuration shown in FIG. 4 is obtained. In this configuration, the tool cartridge 1 can receive a three-part punching tool.

Figure 5:
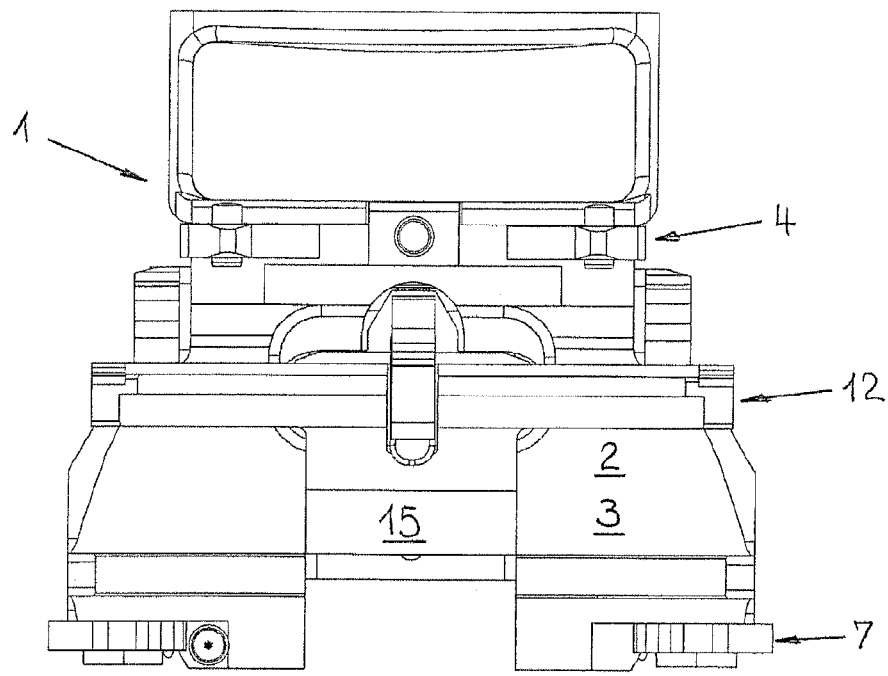
FIG. 5 is a front view of the tool cartridge and mounted stripper holder shown in FIG. 4.
Figure 6:
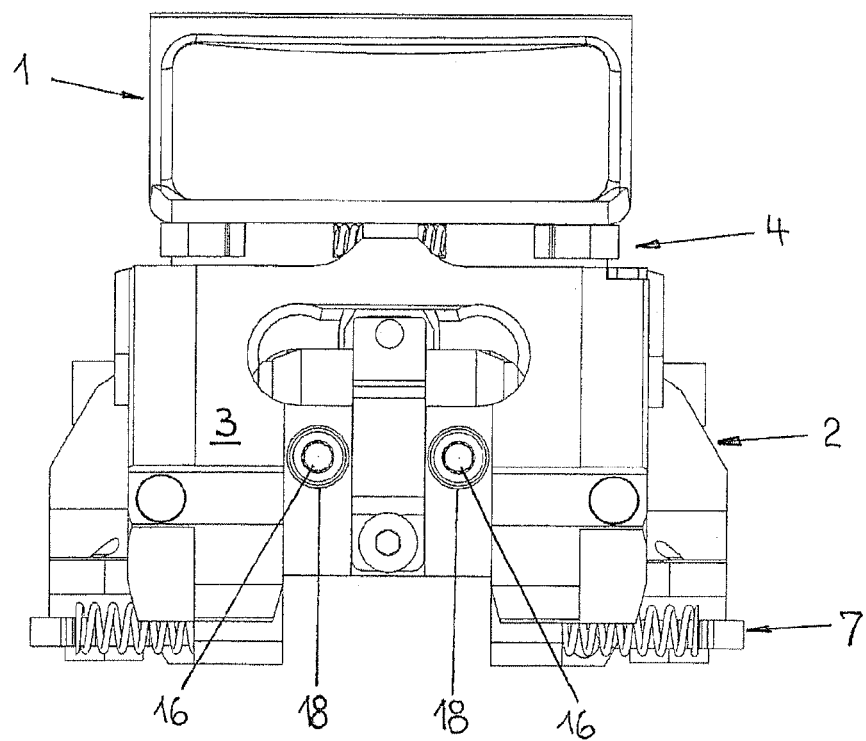
FIG. 6 is a rear view of the tool cartridge and mounted stripper holder shown in FIG. 4.

FIG. 5 illustrates the accuracy of fit with which the mounting attachment 15 of the stripper holder 12 engages in the wall opening 17 at the base body rear wall 3 of the cartridge base body 2.

If a forming tool is to be fastened to the tool cartridge 1 in place of a punching tool, the stripper holder 12 is typically demounted. To demount the stripper holder 12, the fastening screws 16 are first removed. The stripper holder 12 can then be removed from the wall opening 17 of the base body rear wall 3 of the cartridge base body 2. Once the stripper holder 12 is removed, the tool cartridge 1 is in the arrangement shown in FIGS. 1 to 3.

A number of embodiments have been described. Nevertheless, it will be understood that various modifications may be made without departing from the spirit and scope of the disclosure. Accordingly, other embodiments are within the scope of the following claims.

What is claimed is:

1. A tool cartridge on figured to detachably hold tool parts of a multi-part processing tool for processing sheet metal workpieces, the tool cartridge comprising:
    a cartridge base body;
    a base body rear wall defining a rear side of the cartridge base body and having a wall opening;
    a base-body-side fastening device on the cartridge base body;
    a punch holder configured to detachably hold (i) a punch of a multi-part processing tool in the form of a multi-part forming tool or (ii) a punch of a multi-part processing tool in the form of a multi-part punching tool; and
    a die holder configured to detachably hold (i) a die of the multi-part forming tool or (ii) a die of the multi-part punching tool,
    a stripper holder configured to detachably hold a stripper of the multi-part punching tool,
    the punch holder and the die holder projecting from a front side of the cartridge base body and being arranged one above another to form an intervening space, and the rear side of the cartridge base body being opposite from free ends of the punch holder and the die holder,
    wherein the wall opening of the base body rear wall of the cartridge base body is arranged within the intervening space between the punch holder and the die holder and open towards the front side of the cartridge base body,
    wherein the wall opening of the base body rear wall is configured to detachably receive the stripper holder such that in the absence of the stripper holder there are no interfering contours attributable to the stripper holder in the intervening space formed by the punch holder and the die holder, and
    wherein the base-body-side fastening device is configured to detachably connect the stripper holder received in the wall opening of the base body rear wall to the cartridge base body, the tool cartridge with the stripper holder connected to the cartridge base body being configured to receive the multi-part punching tool, and the tool cartridge without the stripper holder connected to the cartridge base body being configured to receive the multi-part forming tool.

2. The tool cartridge according to claim 1, wherein the wall opening of the base body rear wall comprises a receiving pocket that is open towards the front side of the cartridge base body and is defined along its rear side by a reduced-thickness portion of the base body rear wall.

3. The tool cartridge according to claim 2, wherein the reduced-thickness portion of the base body rear wall that defines the rear side of the receiving pocket is provided with a window-like aperture.

4. The tool cartridge according to claim 1, wherein the wall opening of the base body rear wall is constructed as a window-like opening of the base body rear wall.

5. The tool cartridge according to claim 1, wherein the base-body-side fastening device configured to detachably connect the stripper holder to the cartridge base body is at a wall of the wall opening of the base body rear wall.

6. The tool cartridge according to claim 1, wherein the base-body-side fastening device configured to detachably connect the stripper holder to the cartridge base body is in the form of a threaded fastening device.

7. The tool cartridge according to claim 1, wherein the base-body-side fastening device configured to detachably connect the stripper holder to the cartridge base body is in the form of a snap-in device.

8. The tool cartridge according to claim 1, wherein the base-body-side fastening device configured to detachably connect the stripper holder to the cartridge base body is accessible from a rear side of the cartridge base body.

9. The tool cartridge according to claim 1, wherein the stripper holder has a stripper support for supporting the stripper of the multi-part punching tool and a holding device for detachably fixing the stripper supported on the stripper support to the stripper holder.

* * * * *

UNITED STATES PATENT AND TRADEMARK OFFICE
CERTIFICATE OF CORRECTION

PATENT NO.         : 9,302,308 B2
APPLICATION NO.    : 13/476261
DATED              : April 5, 2016
INVENTOR(S)        : Leonard Schindewolf et al.

Page 1 of 1

It is certified that error appears in the above-identified patent and that said Letters Patent is hereby corrected as shown below:

In the Claims
At column 5, line 19, in Claim 1, delete "on figured" and insert --configured--.

Signed and Sealed this
Ninth Day of August, 2016

Michelle K. Lee
*Director of the United States Patent and Trademark Office*